US009732238B2

(12) United States Patent
Mitchell et al.

(10) Patent No.: US 9,732,238 B2
(45) Date of Patent: Aug. 15, 2017

(54) SOLVENTLESS METHODS OF COATING A CARBON NANOTUBE NETWORK AND CARBON NANOTUBE NETWORKS COATED WITH A POLYMER

(75) Inventors: Katherine P. Mitchell, Pickering, OH (US); Amy M. Heintz, Dublin, OH (US); Brett R. Burton, Columbus, OH (US); Ioan I. Feier, Columbus, OH (US); Timothy J. Lastrapes, Powell, OH (US)

(73) Assignee: Battelle Memorial Institute, Columbus, OH (US)

( * ) Notice: Subject to any disclaimer, the term of this patent is extended or adjusted under 35 U.S.C. 154(b) by 460 days.

(21) Appl. No.: 13/320,536

(22) PCT Filed: May 14, 2010

(86) PCT No.: PCT/US2010/035035
§ 371 (c)(1),
(2), (4) Date: Feb. 1, 2012

(87) PCT Pub. No.: WO2010/132858
PCT Pub. Date: Nov. 18, 2010

(65) Prior Publication Data
US 2012/0138589 A1    Jun. 7, 2012

Related U.S. Application Data

(60) Provisional application No. 61/178,453, filed on May 14, 2009.

(51) Int. Cl.
*C09D 7/12* (2006.01)
*C09D 5/00* (2006.01)
(Continued)

(52) U.S. Cl.
CPC ............. *C09D 7/1291* (2013.01); *C09D 5/00* (2013.01); *C09D 5/24* (2013.01); *C08K 3/04* (2013.01);
(Continued)

(58) Field of Classification Search
CPC ......... B82Y 30/00; B82Y 10/00; C08L 89/00; C09D 5/24; H05B 2214/02; H05B 2214/03; H05B 2214/04
(Continued)

(56) References Cited

U.S. PATENT DOCUMENTS 4,002,708 A    1/1977  Lott
4,695,618 A    9/1987  Mowrer
(Continued)

FOREIGN PATENT DOCUMENTS

EP    0693512           1/1996
GB    1011436          12/1965
WO    WO 2008054473 A2 *  5/2008

OTHER PUBLICATIONS

Petrovic, Zoran., Polyurethanes from Vegetable Oils, Polymer Reviews, 48, 109-155, 2008.*
(Continued)

*Primary Examiner* — Francisco Tschen
(74) *Attorney, Agent, or Firm* — Frank Rosenberg; C. Michael Gegenheimer

(57) ABSTRACT

A method of coating a carbon nanotube material with a solventless coating composition is described. The resulting coating has been shown to preserve the conductivity of the conductive layer and protect the conductive layer from the effects of subsequent coating compositions. Examples are shown in which the coating formulation comprises a polyol (Continued)

and an isocyanate. A layer material comprising a polyurethane coating on a carbon nanotube network layer is also described.

19 Claims, 2 Drawing Sheets

(51) Int. Cl.
*C09D 5/24* (2006.01)
*C08K 3/04* (2006.01)
*C08K 9/08* (2006.01)

(52) U.S. Cl.
CPC ............ *C08K 9/08* (2013.01); *H05B 2214/00* (2013.01); *H05B 2214/03* (2013.01)

(58) Field of Classification Search
USPC .......... 219/202, 546, 548, 553; 427/58, 203, 427/407.1; 977/700
See application file for complete search history.

(56) References Cited

U.S. PATENT DOCUMENTS

| | | | | |
|---|---|---|---|---|
| 4,892,906 | A * | 1/1990 | Pham | C08G 18/4063 524/730 |
| 5,554,691 | A | 9/1996 | St. Clair | |
| 6,506,461 | B2 * | 1/2003 | Affinito | 427/535 |
| 6,683,783 | B1 | 1/2004 | Smalley | |
| 7,118,693 | B2 | 10/2006 | Glatowski | |
| 7,994,354 | B2 | 8/2011 | Beneckes | |
| 2003/0096119 | A1 * | 5/2003 | Kimura et al. | 428/412 |
| 2003/0143453 | A1 * | 7/2003 | Ren | B82Y 10/00 429/209 |
| 2004/0104660 | A1 * | 6/2004 | Okamoto | B82Y 10/00 313/346 R |
| 2005/0209392 | A1 | 9/2005 | Luo | |
| 2008/0044651 | A1 | 2/2008 | Douglas | |
| 2008/0083721 | A1 * | 4/2008 | Kaiserman | A43B 3/0005 219/211 |
| 2008/0152870 | A1 * | 6/2008 | Takada | B82Y 20/00 428/174 |
| 2008/0207817 | A1 | 8/2008 | Bounia | |
| 2008/0292840 | A1 * | 11/2008 | Majumdar | B32B 3/14 428/114 |
| 2010/0021736 | A1 * | 1/2010 | Slinker | F28F 13/00 428/408 |
| 2010/0126981 | A1 | 5/2010 | Heintz | |

OTHER PUBLICATIONS

Itkis ME, Perea DE, Niyogi S, Rickard SM, Hamon, MA, Hu H, Zhao B, and Haddon RC, "Purity evaluation of as-prepared single-walled carbon nanotube soot by use of solution-phase near-IR spectroscopy", Nano Lett., 2003, 3(3), 309.
Hu L, Hecht DS, and Gruner G, "Percolation in transparent and conducting carbon nanotube networks", Nano Lett., 2004, 4(12), 2513-2517.
Information disclosure statement (IDS) form U.S. Appl. No. 13/320,536.
Written opinion of the international searching authority for PCT/US2010/035035, dated Nov. 14, 2011.
International search report for PCT/US2010/035035, dated Jan. 6, 2011.
International preliminary report on patentability for PCT/US2010/035035, dated Mar. 10, 2012.
Communication from the European patent office for publication # EP2430640 (Application # 10728945.6-1218), mailed on Aug. 22, 2012.
Ashrafi, Behnam et al., "Correlation between Young's modules and impregnation quality of epoxy-impregnated SWCNT buckypaper" Composites: Part A 41 (2010) 1984-1191.
Spitalsky, Z et al., "High Volume traction carbon nanotube-epoxy composites" Nanotechnology 20 (2009) 405702 (7 pp).

* cited by examiner

SOLVENTLESS METHODS OF COATING A CARBON NANOTUBE NETWORK AND CARBON NANOTUBE NETWORKS COATED WITH A POLYMER

RELATED APPLICATIONS

This application is the United States national stage filing of, and claims priority to PCT/US2010/035035, filed 14 May 2010. This application also claims priority to U.S. Provisional Patent Application Ser. No. 61/178,453, filed 14 May 2009.

INTRODUCTION

Carbon nanotubes (CNTs) are being explored in a variety of applications that exploit their high electrical conductivity. CNTs can be formulated into a suspension and deposited on a surface to produce a film of interpenetrating CNTs, called CNT networks. These CNT networks are of interest in applications including transparent electrodes; electrically conductive coatings for EMI shielding or lightning strike protection; and heaters for aircraft anti-icing. CNTs can also be formulated into macroscopic fibers and threads that can be used for applications including electronic textiles, non-metallic wiring, or lightning strike protection. In all these applications, the stability of the sheet resistance is critical. The resistance of CNTs is sensitive to elevated temperature, humidity, and solvent exposure.

In aerospace applications, a primer is required to prevent corrosion of the metal substrate, while a topcoat is also required to resist degradation from ultraviolet light, chemicals, water, abrasion and other types of environmental and in-flight exposure hazards. Both primer and topcoat coatings are designed in coordination with each other for optimum adhesion to the substrate and to each other. Introduction of an additional coating element, such as a CNT for an electrically conductive resistive heating area to prevent icing of wings or other critical areas, requires careful consideration of end use durability.

Primer coating chemistries may include epoxy or polyurethane resins with anti-corrosive fillers and pigments to protect the steel or aluminum airframes from rust and corrosion which can quickly deteriorate the integrity of the aircraft. Topcoat aerospace coating chemistries are typically polyurethane resins with filler and pigments designed to protect the aircraft from intense ultraviolet light, exposure to chemicals such as jet fuel and deicing liquids' and abrasion resistance from fuels lines, stones, rocks or other debris.

CNT networks designed to provide electrically conductivity for EMI shielding or anti-icing of aircrafts may be applied as the outermost coating layer, but, generally, a topcoat will be required to meet the durability requirements for this type of exterior application.

There are examples in the prior art of polyurethane coatings on a CNT layer. Heintz et al, in WO 2008/085550, which is assigned to Battelle, describes a conductive nanotube network layer on a substrate (a preferred substrate is an airplane wing). The conductive nanotube network layer can form a resistively heatable film. This patent application states: "Examples of suitable coatings include PRC Polyurethane 8800 series, Deft Inc. M85285-I-36176 and M85285-I-36375." This reference does not describe the use of solventless polyurethane coatings. Luo et al. in U.S. Published Patent Application Publication No. 2005/0209392 describe depositing a conductive nanotube network layer on a substrate. These workers then deposit a polymer binder, which could be polyurethane that "diffuses into the CNT network or mat" to provide protection from mechanical damage and moisture infiltration. Although these workers include polyurethane in a long list of possible binders, there are no descriptions of a solventless polyurethane coating.

Biobased polyols are known. WO 2007/027223A2, which is incorporated herein as if reproduced in full below, describes biobased polyols that can be advantageously used to form polyurethane coatings. Lu and Larock in "Soybean-Oil-Based Waterbourne Dispersions: Effects of Polyol Functionality and Hard Segment Content on Properties," Biomacromolecules 2008, 9, 3332-3340 describe aqueous dispersions of biobased polyurethane. The authors do not report coating onto carbon nanotubes.

There are numerous publications that describe composites formed from carbon nanotubes and polyurethane. For example, Glatowski et al. in U.S. Pat. No. 7,118,693 describe conformal conductive nanotube coatings that were made from blends of polyurethane and carbon nanotubes. The Examples use a moisture curing polyurethane. Kwon et al. in "Comparison of the Properties of Waterbourne Polyurethane/Multiwalled Carbon Nanotube Composites Prepared By In Situ Polymerization," J. Poly. Sci: Part A: Polymer Chem. vol. 43, 3973-3985 (2005) describe composites made from aqueous dispersions of polyurethane and carbon nanotubes. Xia et al. in "Preparation and characterization of polyurethane grafted single-walled carbon nanotubes and derived polyurethane nanocomposites," Soft Matter, 2006, 16, 1843-1851 reported the preparation of polyurethane-carbon nanotube composites from a process in which the nanotubes were first functionalized with hydroxyl groups and reacted in a stepwise manner (see FIG. 1) to control the structure of the composite. Xia et al. in "Preparation and characterization of polyurethane-carbon nanotube composites," Soft Matter, 2005, 1, 386-394 reported the preparation of polyurethane-carbon nanotube composites from blended dispersions of polyols and CNTs. El Bounia in U.S. Published Patent Application Publication No. 2008/0207817 describe various CNT/polymer composites.

Miyagawa et al., "Nanocomposites from biobased epoxy and single-wall carbon nanotubes: synthesis, and mechanical and thermophysical properties evaluation," Nanotechnology, 2005, 16, 118-124 describe a carbon nanotube composite made from a biobased epoxy.

SUMMARY OF THE INVENTION

The present invention relates generally to a coated carbon nanotube network and methods of coating a carbon nanotube network with a solventless coating composition. In preferred embodiments, the invention provides liquid film-forming compositions having isocyanate crosslinking agents, either acrylic or polyester polyols having groups that are reactive with isocyanates acting as a protective coating for a conductive nanotube network. This coating is mechanically durable and chemically resistant enough after curing to prevent subsequent coatings from reducing the conductivity of the carbon nanotube network. Depending on the application, subsequent coatings may be desired to add color, enhance exterior durability, enhance chemical durability or improve corrosion resistance. A protective coating would enhance the usability of carbon nanotube networks in a wide variety of applications such as resistive heating areas for aircraft wings. The topcoats used for aerospace applications are required to meet a demanding variety of tests such as military specifications for performance.

The resistance of CNT materials is susceptible to changes upon contact with certain solvents or polymer systems. Yet many applications require that the CNT material is coated with, for example, a protective top coat. During our efforts to incorporate the CNT network layers into commercially available coating systems for aerospace applications, we discovered that when a typical aerospace topcoat was applied directly to the CNT network, the conductivity would decrease to the point of failure of the resistive heating operation.

We have discovered compositions and methods, that when applied on top of the CNT material, do not change substantially increase resistance. This applied layer may be used to insulate the CNT material from solvents, particularly those used in commercially available topcoats, to retain the electrical properties of the native CNT material.

The aqueous or non-aqueous solvent present in common aerospace top coats, when applied to a CNT material, may disrupt the electrical properties of the CNT material by several mechanisms. One mechanism is by increasing the electrical resistance between adjacent CNTs. Topcoats dissolved in solvents can infiltrate the CNTs, permitting the topcoat resin system to permeate and cure between the individual CNT fibers. The CNTs require intimate contact to transport electrical charge from one CNT to another; charge transport takes place though either tunneling or hopping. If a non-conductive polymer resin remains between the CNTs, it prevents close contact of CNTs, which increases the energy associated with electron hopping or tunneling, and behaves as a high resistance resistor in series. The effect is that the bulk conductivity of the CNT material is reduced significantly. Treatment of CNTs with surfactants or dispersing agents is often used to improve their interaction with water or solvents. After film formation; these surfactants and dispersing agents often remain in the film, continuing to modify the surface properties of the CNTs. This renders the CNT layer more susceptible to penetration by aqueous or non-aqueous solvents.

Surfactants could include typical anionic, cationic, and non-ionic surfactants known in the art to stabilize CNTs. Dispersing agents could include molecules and polymers that stabilize CNTs by steric stabilization, such as alkylamines, or by non-covalent modification, such as pyrenes and naphthalene sulfonic acids.

Another mechanism is related to the effect of solvents on the electronic properties of the CNTs. The electrical properties of CNTs are very sensitive to environment. One common way to prepare CNT materials is to employ acid oxidation methods to improve their dispersibility in water and solvents. After deposition and drying, these CNTs remain p-doped. The electrical resistance of such films is susceptible to electron donating solvents such as those typically used in commercial aerospace topcoat coatings. Electron donating solvents include common solvents such as water, diethyl ether, tetrahydrofuran, dimethylformamide, N-methylpyrrolidinone, ethanol, methanol, isopropanol. Other common ways to prepare CNT materials include the use of dispersing agents. These systems are generally undoped systems, or un-intentionally p-doped by adventitious dopants such as oxygen. The resistance of these systems also increases upon exposure to water and other electron-donating solvents. Finally, CNT materials are sometimes formulated with a second material that behaves as an intentional p-dopant. Treatment with water or solvents can remove or dilute the effect of the p-dopant on the CNT material; thereby increasing its resistance.

Water-based coatings change the electrical properties of CNT networks, due to the fact that water is an n-dopant for CNTs, it tends to compensate dope the p-doped CNTs, which increases its resistance. As more environmentally friendly water-based coating systems are being developed for many applications, including aerospace, this threat to CNT materials must also be addressed.

We have discovered that a solvent-free protective layer can be used to prevent the change in resistance that accompanies the application of either organic-solvent-based or water-based coatings to CNT materials. The present invention can provide advantages such as conductivity preservation and good adhesion to subsequent topcoat chemistries. Another advantage, in some preferred embodiments utilizing polyurethane, is that the polyol component may be derived from vegetable oils rather than petrochemical feed stock.

In one aspect, the invention provides a method of making a layered CNT-containing composition, comprising: providing a CNT layer that is disposed on a substrate; and applying a solventless polymer precursor directly onto the CNT layer.

Additional preferred characteristics of the method include one or more of the following: curing the polymer precursor to form a polymer layer in contact with the CNT layer; the resistivity of CNT layer changes by 81% or less after coating; more preferably less than 10% before and after coating; solventless precursor comprises a diisocyanate and a diol; any of the compositions, conditions and measurable properties discussed in the Description of the Invention.

The invention also includes a layered material made by any of the methods described herein. A polymer coating prepared from a solventless method can be identified either by knowledge of the synthetic method, or by physical characterization of the polymer layer—for example, electron microscopic methods to identify surface morphology and cross-sectional morphology associated with polymer cured under solventless conditions.

In another aspect, the invention provides a layered CNT-containing article, comprising: a substrate; a conductive CNT network layer disposed between the substrate and a polyurethane coating; wherein the polyurethane coating is in direct contact with the CNT layer; and further wherein the underlying CNT layer has a sheet resistance of 120 Ω/square or less, more preferably a sheet resistance of 25 Ω/square or less, and still more preferably a sheet resistance of 1 Ω/square or less. Typically, the CNT network layer is p-doped. In some embodiments, the CNT network layer does not contain residual dispersing agent or surfactant (such as might be left behind in a dispersed CNT network layer made from non-p-doped CNTs). In some preferred embodiments, the combined CNT network layer and polyurethane coating consist essentially of CNTs and polyurethane (in other words, there are no additional components present that would decrease resistance or reduce stability of the coated CNT layer). In some preferred embodiments, the polyurethane does not contain polyether moieties. In some preferred embodiments the polyurethane does not contain any sulfate groups; preferably, the polyurethane is nonionic. In some preferred embodiments, the polyurethane is made from a polyol that is derived from vegetable oil (this can be observed spectroscopically from the ester groups in the polyurethane); in some preferred embodiments, the polyurethane is derived from an azelaic ($C_9$) ester polyol (see WO/2007/027223); in some preferred embodiments, the polyurethane comprises an azelaic ($C_9$) ester moiety. Preferably the article possesses the ability to function as a resistive heater to temperature up to 400° C., in some embodiments, in the range of 40 to 180° C., by application of a voltage in the range of 5 to 240 V. Preferably, the underlying CNT layer maintains shielding effectiveness greater than 20 dB and more preferably greater than 40 dB. In some preferred embodiments, the substrate is an airplane or part of an airplane such as a wing. The geometric surface area (that is, the area that can be measured by a ruler rather than BET surface area) of the coated article is preferably at least 0.5 cm×0.5 cm, more preferably at least 1 cm×1 cm.

The polyurethane coating provides sufficient chemical resistance so as to prevent solvents (including water), or other environmental hazards from subsequently applied coatings or solvents from penetrating the polyurethane and disrupting the CNT network or changing its conductivity significantly.

The invention also includes methods of preventing ice formation or removing ice from surfaces (such as wing surfaces) by resistive heating of a layer made according to the invention.

The invention may be further defined by any of the properties identified by the measurements described in the Examples; for example, electrical resistance or de-icing under conditions specified in the Examples.

Glossary of Terms

The term "carbon nanotube" or "CNT" includes single, double and multiwall carbon nanotubes and, unless further specified, also includes bundles and other morphologies. The invention is not limited to specific types of CNTs. The CNTs can be any combination of these materials, for example, a CNT composition may include a mixture of single and multiwall CNTs, or it may consist essentially of DWNT and/or MWNT, or it may consist essentially of SWNT, etc. CNTs have an aspect ratio (length to diameter) of at least 50, preferably at least 100, and typically more than 1000.

"Solventless" means that at least 90 mass %, preferably at least 99 mass %, more preferably 100% of the formulated coating composition remains in the dried film after cure has taken place; in the case of reactants that react to form a polymer and a low molecular weight volatile molecule, the volatile product is not included in the calculation of mass %. In some preferred embodiments, the coating formulation consists essentially of a polyurethane precursor so that at least 99 mass % of the formulated coating composition remains in the dried film after cure has taken place. In a solvent-based or water-based system, there is a higher percentage of the liquid coating which is made up of an organic solvent or water which will evaporate during the curing process.

The invention is often characterized by the term "comprising" which means "including." In narrower aspects, the term "comprising" may be replaced by the more restrictive terms "consisting essentially of" or "consisting of."

BRIEF DESCRIPTION OF THE FIGURES

FIG. 2 is a data table of the results of tests run in an icing wind tunnel.

DETAILED DESCRIPTION OF THE INVENTION

Figure 1:
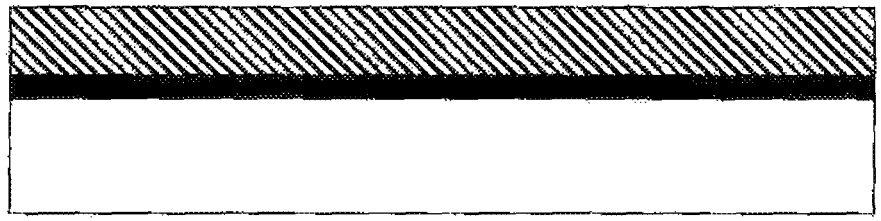
FIG. 1 schematically illustrates an article comprising a substrate (bottom, white), a layer of carbon nanotubes (gray), and an overcoat of polymer (top).

Prior to coating with a solventless polymer precursor composition, a CNT network layer is in the form of a CNT/air composite, for example a CNT network film, a paper or cloth-like layer of CNTs, or a macroscopic fiber of CNTs. CNT network layers of the present invention preferably contain at least 25 weight % CNT, in some embodiments at least 50 wt %, and in some embodiments 25 to 100 wt % CNT. The CNTs can be distinguished from other carbonaceous impurities using methods known to those skilled in the art, including NIR spectroscopy ("Purity Evaluation of As-Prepared Single-Walled Carbon Nanotube Soot by Use of Solution-Phase Near-IR Spectroscopy," M. E. Itkis, D. E. Perea, S. Niyogi, S. M. Rickard, M. A. Hamon, H. Hu, B. Zhao, and R. C. Haddon, Nano Lett. 2003, 3(3), 309) Raman, thermogravimetric analysis, or electron microscopy (Measurement Issues in Single Wall Carbon Nanotubes. NIST Special Publication 960-19). The CNT network layer (again, prior to coating) preferably has little or no polymer ("polymer" does not include CNTs or carbonaceous materials that typically accompany CNTs— typical examples of polymers include polyurethane, polycarbonate, polyethylene, etc.); preferably the network layer comprises less than 5 wt % polymer, more preferably less than 1 wt %) The volume fraction in the network layer is preferably at least 2% CNTs, more preferably at least 5%, and in some embodiments 2 to about 90%. The remainder of the composite may comprise air (by volume) and/or other materials such as residual surfactant, carbonaceous materials, or dispersing agent (by weight and/or volume).

After the CNT network layer has been coated, it retains electrical conductivity provided by contacts between CNTs; it is not a dispersion of CNTs in a polymer matrix. Typically, a cross-sectional view of the composite material will show a polymer layer that contains little or preferably no CNTs and a CNT network layer that comprises CNTs (and possibly other carbonaceous materials that commonly accompany CNTs, as well as surfactants) with little or no polymer. Preferably, a CNT network layer that has an overlying polymer coating comprises 50 mass % or less of the coating polymer within the CNT layer, more preferably 25 mass % or less, and still more preferably 10 mass % or less of the coating polymer within the layer. Preferably, a CNT layer comprises at least 25 mass % CNTs and carbonaceous materials, and preferably at least 50 mass % CNTs and in some embodiments 30 to 100 mass % CNTs. CNT networks and CNT fibers have very distinct rope-like morphology as observed by high resolution SEM or TEM. See for example Hu, L.; Hecht, D. S.; and Gruner, G. *Nano Lett.*, 4 (12), 2513-2517 for CNT networks and U.S. Pat. No. 6,683,783 for images of CNT fibers. Because the CNT layers typically contain little or no polymer, they exhibit surface roughness, if characterized by AFM, associated with the CNT diameter and bundle size, in the range of 0.5 to 50 nm. Preferably, the coating composition contacts the surface of the CNT network layer but does not fill spaces within the network layer. Penetration of a coating into the CNT layer could also be determined by crosssection of the multi-layer sample and then analysis by methods such as SEM-EDS or XPS; the CNT layer is preferably substantially free from N-groups that are associated with the topcoat.

CNT layers have many contacts between CNTs and good conductivity that is, a resistivity less than 0.05 $\Omega \cdot cm$, preferably less than 0.002 $\Omega \cdot cm$. The sheet resistance of this layer should be less than 500 $\Omega$/square, preferably less than 200 $\Omega$/square, more preferably less than 50 $\Omega$/square. The CNT layer may be planar, cylindrical, or other contiguous geometry; in some preferred embodiments, the CNT layer is substantially planar (similar to a sheet of paper or a non-woven textile sheet, a few fibers may project from a planar layer). These are preferred characteristics of the CNT layer both before and after a coating is applied over the CNT layer.

A CNT network in this invention can be prepared as a dispersion of CNTs applied directly to a substrate where the solvents used in the dispersion process are evaporated off leaving a layer of CNTs that coagulate together into a continuous network. The CNT network may be prepared from dispersions and applied by coating methods known in the art, such as, but not limited to, spraying (air assisted airless, airless or air), roll-coating, gravure printing, flexography, brush applied and spin-coating. The thickness of the CNT layer is in the range from 0.005 μm to 100 μm, preferably in the range of 0.05 μm to 100 μm, more preferably in the range of 0.3 μm to 100 μm.

The CNT layer may include other optional additives such as p-dopants. P-dopants could include, but are not limited to, perfluorosulfonic acids, thionyl chloride, organic pi-acids, nitrobenzene, organometallic Lewis acids, organic Lewis acids, or Bronsted acids. Materials that function as both dispersing agents and dopants such as Nafion and hyaluronic acid may be present. These materials contain p-doping moieties, i.e. electron accepting groups, within their structure, often as pendant groups on a backbone. Generally, these additives will be present as less than 70% by weight of the CNT film, and in some embodiments as less than 50% by weight of the CNT film. Polymers and carbohydrates that function as both dispersing agents and dopants can be distinguished from other polymer materials, i.e. those functioning as only a dispersing agent or those functioning as a structural component. Because of the presence of electron accepting moieties, these materials can form a charge transfer complex with semiconducting CNTs, which p-dopes the semiconducting CNTs and raises the electrical conductivity. Thus, these dual dispersing agent/dopants can be tolerated at a higher mass percentage within the CNT layer than other types of polymer materials or surfactants.

The solventless coating composition comprises reactive components that react to form a solid coating; preferably the composition comprises a polyol and an isocynate. The polyol component of the present invention contains both (i) functionality capable of reacting with isocyanate groups ("isocyanate-reactive") and (ii) 100% solids content (free from any organic or water solvent). The expression "isocyanate-reactive" functionality as used herein refers to the presence of functional groups that are reactive with isocyanate groups under conditions suitable for cured coating formation. Such isocyanate-reactive functionality is generally known to those skilled in the coatings are and includes, most commonly, active hydrogen-containing functionality such as hydroxyl and amino groups. Hydroxyl functionality is typically utilized as the isocyanate-reactive functionality in coatings and is essentially suitable for use in the present invention. In some embodiments, the polyol is a polyester polymer having isocyanate-reactive functionality incorporated into the polymer via appropriate monomer selection. Examples of monomers that may be utilized to synthesis the polyester polyol include carboxyl group-containing ethylenically unsaturated monomers and hydroxyl group-containing ethylenically unsaturated monomers.

Any solventless, preferably 100% solids, (free of organic and water solvent) suitable isocyanate compound or mixture of compounds can be used as the curing agent in the present invention. To function as an effective crosslinking agent, the isocyanate should have at least two reactive isocyanate groups. Suitable polyisocyanate crosslinking agents may contain aliphatically, cycloaliphatically, araliphatically and/or aromatically bound isocyanate groups. Mixtures of polyisocyanates are also suitable. Polyisocyanate containing aliphatically, cycloaliphatically, araliphatically and/or aromatically bound polyisocyanate groups are also suitable. This includes, for example: hexamethylene trimethylhexamethylene diisocycante, meta-α,α,α',α'-tetramethylxylylenediisocyanate, 1-isocyanato-3,3,5-trimethyl-5-isocyanatomethyl cyclohexane (isophoronoe diisocyanate or "IPDI"), bis(4-isocyanatocyclohexyl)methane (hydrogenate MDI), toluene diisocyanate ("TDI"), hexamethylene diisocyanate ("HDI") or biuret derivatives of various diisocyanates.

The methods and articles of the invention can be accomplished using a bio-based polymer. A bio-based polymer is a polymer that contains at least 40 mass %, preferably at least 50%, still more preferably at least 80 mass % and most preferably 100 mass % of materials that were derived from bio-based feedstock such as corn, soy, castor, etc.; as opposed to petroleum based feedstock raw materials. As shown in the examples, a preferred polyol is a biobased polyol.

In addition to the components discussed above, other additives can also be incorporated such as cure catalysts. Cure catalysts for isocyanate are well known to those skilled in the art such as organometallic catalysts and, particularly, organotin compounds such as dibutyltin diacetate, dibutyltin dioxide, bibutyltin dilaurate and the like. Other optional ingredients such as surfactants, defoamers, thixotropic agents, anti-gassing agents, flow control agents, pigments, fillers, and other additives without added organic or water solvents may be included in the composition. In preferred embodiments, the polymer precursor composition comprises at least 90 mass %, more preferably at least 95 mass % (in some embodiments at least 98 mass %) of components that, after curing, are bonded to the polymer structure.

The thickness of the coating composition over the CNT material is preferably 2 mm or less, more preferably 150 μm or less, preferably 50 μm or less, in some embodiments, a thickness of 250 nm to 50 μm; thicker layers can experience foaming or bubbling during application that leads to pathways for a subsequent topcoat to penetrate and disrupt the conductivity of the CNT layer.

The solventless coating composition can be applied to the CNT network by known methods; for example, bar coating or spraying. Techniques, such as troweling, that disrupt the CNT network should be avoided. After application of the protective coating to the CNT network, the coated substrate is cured (in some embodiments, curing is conducted at ambient temperature). In the curing operation, the film forming materials crosslink to leave a mechanically durable and chemically resistant film.

The sheet resistance of the CNT layer before coating may be determined by standard 4-point probe methods or other known methods for determining sheet resistance. The impact of the subsequent coatings on the sheet resistance of the underlying material may be determined by one of several methods, depending on the applications of interest. Metallic leads, such as silver painted leads, may be applied under or over the CNT layer and the resistance measured. Subsequent overcoats may then be applied on top of the CNT layer and the resistance re-examined. Application of the coating of this invention should result in less than 81% change in resistance, preferably less than 10% change in resistance, and still more preferably less than 5% change in resistance, after curing the coating. Likewise, application of subsequent layers on top of this stack should not increase the resistance by more than 5%, preferably by 3% or less. Alternatively, one could measure the shielding effectiveness of a CNT film before and after application of coatings, using a method such as SAE ARP-1705. Application of the coating of this invention should result in less than 38% change in shielding effectiveness, more preferably less than 5% after curing the coating. Likewise, application of subsequent layers on top of this stack (that is, the CNT network layer and the protective coating) should not decrease the shielding effectiveness by more than 5%.

CNT films containing optional p-dopant additives will show spectroscopic evidence for the presence of these dopants, before and after treatment with the coating of this invention, as well as after subsequent application of coatings to this layer. The presence of these p-dopants can be determined from chemical analysis of the CNT layer, looking for spectroscopic signatures of the dopant compounds. Alternatively, p-doped CNTs have specific NIR absorbance and Raman scattering signatures that can be detected without knowledge of the dopant's chemical structure. For example, evidence of p-doping can be determined from NIR spectroscopy. The optical absorbance spectrum of CNTs is characterized by S22 and S11 transitions, whose positions depend upon the structure distribution of the CNTs and can be determined by a Kataura plot. These two absorption bands are associated with electron transitions between pairs of van Hove singularities in semiconducting CNTs. Depletion of filled states by an electron acceptor results in bleaching of these transitions, and evidence of p-doping by the subject coating. Alternatively, p-doping can be determined from Raman spectroscopy as described by Rao, A. M.; Bandow, S.; Richter, E.; Eklund, P. C. in Thin Solid Films 1998, 331, 141-147.

EXAMPLES

Initial sheet resistance was determined by measuring the resistance at two parallel silver electrodes painted outside the edges of a rectangle sample to create a 2 inch by 3 inch (5 cm×7.6 cm) area. The sheet resistance after coating was measured by measuring the resistance from the same two silver electrodes which were not topcoated.

Comparative Examples 1 and 2

1. 3 inch×3 inch (7.6 cm×7.6 cm) Nomex test panels were prepared by priming with Alexit MC-300™ polycarbonate high solids chromate primer. The coat was mix per vendor instructions and applied using an #18 wire wound bar. Coatings were permitted to cure overnight at room temperature.

2. Multiwall nanotubes (MWNTs) with diameter less than 10 nm were obtained from Helix Materials Solutions. The MWNTs were oxidized using a mixture of sulfuric and nitric acid in a microwave reactor. As an example: a 25 mL glass microwave reactor vessel was charged with 100 mg of MWNTs, 1.0 mL 70% nitric acid, and 9.0 mL sulfuric acid. The vessel was loaded into a CEM Discover microwave reactor and reacted for 5 minutes at constant temperature of 130° C. The contents were then passed through a 0.1 µm PVDF membrane filter and rinsed with water until the pH of the filtrate was 5. The washed MWNTs dried by freeze-drying.

3. The MWNTs were dispersed in 50% isopropanol and 50% acetone by tiphorn sonication for 20 minutes. The resulting dispersion had a concentration of 1.7 mg/mL 4. After cure, the panels were taped off to expose two areas of approx. 1"×2" (2.5 cm×5 cm).

5. An acid-doped carbon nanotube dispersion was spray applied in successive layers until a resistivity of approx. 100 ohms/square was reached on the surface. Silver lead paint was applied to the area with leads approximately 1 inch apart. This created a square of carbon nanotube network of 1 square inch (2.5 cm×2.5 cm).

6. Two coatings were applied, one over each exposed area leaving small uncoated area on the silver lead paint for measuring resistance.

7. Alexit MC-300 (organic solvent based coating system) was applied over one of the areas and the resistance increased dramatically to 1,100 ohms/square after the coated had cured.

8. A commercially available organic solvent based aerospace polyurethane topcoat (Deft-03GY292™) was applied over the other conductive area and the resistance increased to 500 ohms/square.

Example 1

1. A second 3 inch by 3 inch (7.6 cm×7.6 cm) Nomex panel was prepared using the same procedure as steps 1-5 above for Comparative Example 1. The initial resistance was 66 ohms/square at the silver leads.

2. A 100% solids polyurethane coating was applied to the conductive area. comprising:
    a. A 100% solids biobased polyol 2 grams
    b. A 100% solids isocyanate (Bayhydur 302™) 3 grams
    c. Dibutyl tin dilaurate catalyst 0.02 grams 3. The resistance after curing remained low at 120 ohms/square at the silver leads.

4. A commercially available aerospace polyurethane topcoat manufactured by Deft-03GY292™ was applied over the area protected by the 100% solids polyurethane coating from step 10. The resistance remained at 120 ohms/square.

Example 2

This is an additional example of a 100% solids protective topcoat comprising a bio-based polyol and a hexamethylene diisocyanate hardener.

1. 2 inch×2 inch (5 cm×5 cm) Nomex test panels were prepared by priming with Alexit MC-300™ polycarbonate high solids chromate primer. The coating was mixed per vendor instructions and applied using an #18 wire wound bar. Coatings were permitted to cure overnight at room temperature.

2. Multiwall nanotubes (MWNTs) with diameter less than 10 nm were obtained from Helix Materials Solutions. The MWNTs were oxidized using a mixture of sulfuric and nitric acid in a microwave reactor. As an example: a 25 mL glass microwave reactor vessel was charged with 100 mg of MWNTs, 1.0 mL 70% nitric acid, and 9.0 mL sulfuric acid. The vessel was loaded into a CEM Discover microwave reactor and reacted for 5 minutes at constant temperature of 130° C. The contents were then passed through a 0.1 µm PVDF membrane filter and rinsed with water until the pH of the filtrate was 5. The washed MWNTs dried by freeze-drying.

3. The MWNTs were dispersed in 50% isopropanol and 50 vol % acetone by tiphorn sonication for 20 minutes. The resulting dispersion had a concentration of 1.7 mg/mL 4. After cure, the panels were taped off to expose two areas of approx. 1"×2" (2.5 cm×5 cm).

5. An acid-doped carbon nanotube dispersion was spray applied in successive layers until a resistivity of approximately 50 ohms/square was reached on the surface. Silver lead paint was applied to the area with leads approximately 1 inch (2.5 cm) apart. This created a square of carbon nanotube network of 1 square inch (6.5 cm$^2$).

6. A 100% solids polyurethane coating was applied to the conductive area, comprising:
   a. A 100% solids biobased polyol 2 grams
   b. A 100% solids isocyanate (Tolonate HDT-LV2™) 2.97 grams
   c. Dibutyl tin dilaurate catalyst 0.02 grams 7. A commercially available aerospace polyurethane topcoat (Deft-03GY292™) was applied over the area protected by the 100% solids polyurethane coating from step 10. The resistance remained at a low 23 ohms/square.

As shown by Comparative Example 1 and Examples 1 and 2, the application of a solventless polyurethane top coat maintains the electrical resistance of doped CNT coatings. In contrast, CNT layers coated with standard polyurethanes exhibit an increase in resistance between 400% to 1000%. CNT layers coated with 100% solids polyurethane show an increase of only 81%; and when the proper formulation is used the change is as little as 10% or less, and in some formulations (e.g., Example 2), the resistance is decreased.

Comparative Example 3

In this example of an aqueous dispersion of nanotubes, it was discovered that topcoats containing water as the solvent influence the conductivity of CNT networks containing dopants or surfactants.

1. Steel test panels were prepared by priming with Alexit MC-300™ polycarbonate high solids chromate primer. The coat was mix per vendor instructions and applied using an #18 wire wound bar. Coatings were permitted to cure overnight at room temperature.

2. An aqueous dispersion of MWNTs was prepared as follows. 150 mg Nanocyl™ MWNTs (thin MWNT, 95+% purity) were placed in a solution of 75 mg of hyaluronic acid sodium salt in 30 g deionized water. The dispersion was sonicated with a tiphorn sonicator and then centrifuged at 3000 rpm to yield a dark black dispersion.

3. After cure, the panels were taped off to expose an area of approx. 2"×3" (5 cm×7.6 cm). The aqueous MWNT dispersion was applied in successive layers until a resistivity of approx. 80 ohms/square was reached on the surface.

4. A water based polyurethane coating system was applied over the conductive carbon nanotube network.

5. This coating comprised:
   a. 3.43 grams JeffolG30650™ polyol
   b. 7.0 grams water
   c. 0.15 grams dibutyl tin di laurate catalyst
   d. 11.50 grams Bayhydur 302™ isocyanate The resistance at the silver leads increased to 244 ohms/square.

Comparative Example 4

1. A second panel prepared similarly to steps 1-3 in Comparative Example 3 was prepared and the resistance at the silver leads was measured at 83 ohms/square.

2. A commercially available organic-based topcoat MIL-T-81772B™ (Chemsol) was applied and allowed to cure at room temperature.

3. The resistance of this panel did not increase significantly with a measured resistance of 97 ohms.

Comparative Example 5

A fourth panel was prepared similarly to steps 1-3 in Comparative Example 3 was prepared and the resistance at the silver leads was measured at 92 ohms/square.

A commercially available water based emulsion UCAR 6030™ from Dow was applied over the CNT network and permitted to air dry.

The resistance of this panel increased to 158 ohms/square.

Example 3

A third panel prepared similarly to steps 1-3 in Comparative Example 3 was prepared and the resistance at the silver leads was measured at 93 ohms/square.

This panel was coated with a 100% solids topcoat and allowed to cure at room temperature. This coating comprised:
   10.76 grams Desmophen 631A-75™ 100% solids polyester polyol
   10.0 grams Tolonate HDT-LV2™ 100% solids aliphatic HDI isocyanate
   0.04 gram dibutyl tin dilaurate catalyst The resistance of this panel after coating had cured was 99 ohms/square.

In the above examples, many of the polymer precursor compositions contained commercially-available proprietary compositions. The precise make up of these compositions are not critical to the invention. The important aspect is that, surprisingly, solventless compositions resulted in superior coatings as compared to water-based coatings and the invention possesses a surprisingly superior method as compared to organic-solvent based methods which have problems associated with safety and toxicity that accompany the handling of organic solvents. As shown by the data in Comparative Examples 3-5, CNT layers prepared from aqueous surfactant and/or containing species that function as surfactants or dopants are sensitive to water-based coatings (Comparative Examples 3 and 5), but are not sensitive to organic-based coatings (Comparative Example 4). The resistance of these materials increases upon coating with water-based polyurethane topcoats. Coating the CNT layer with a 100% solids polyurethane topcoat (Example 3) yields essentially no increase in the sheet resistance (less than 7%). Once coated with the 100% solids polyurethane, the layered coating system is stable to subsequent exposure to water or organic solvents.

Examples of Coating Performance in Simulated End-Application as Anti-Icing and De-Icing Resistive Heating on Leading Edge of Wing This testing further shows that Battelle's Resistive Heating Coating (RHC) is highly effective for providing a light weight, low power anti-icing/de-icing system.

The Resistive Heating Coating (RHC) has successfully shown anti-icing/de-icing capability as integrated onto a full size wing at representative flight conditions and multiple test points between 0° F. and 28° F. (−18° C. and −2° C.).

To integrate the electrical leads to the RHC coating, flat braided copper power leads were fed through insulated holes and epoxied to wing surface. Power distribution is via alternating +/− leads to form one large parallel circuit. The size and geometry of each RHC "cell" is custom tailored for each application based on supply voltage, RHC thickness, etc. The RHC is then spray applied to wing and exposed leads creating one uniform conductive layer. After the RHC coating has cured the solventless polyurethane clear coating is sprayed applied to seal and protect the RHC and leads.

The carbon nanotube dispersion is applied over fully cured primer (either NCP 280 or Hysol E-60NC) which has been scuffed with a red Scotch Brite™ souring pad. This ensures adhesion between the two coating layers. The best application has been seen by using an artists air brush. The air brush allows for very thin coating application and relatively minor overspray. Given the expense of carbon nanotubes, minimizing the overspray is imperative for cost effectiveness. If the carbon nanotube coating is applied in thick layers, it has a tendency to drip and pool into heavy build areas. These areas are lower in resistance and will result in "hot spots" on the part with uneven thermal distribution when a current is applied.

A typical 5"×5" (13 cm×13 cm) square area of resistive heating used 50 milliliters of carbon nanotube dispersion described below. In this example, approximately 30-35 coats were applied to a substrate heated to 120° F. (49° C.). The warm substrate accelerates the water evaporation of the dispersion.

The large wing section used for wind tunnel testing consisted of 8 5"×5" (13 cm×13 cm) squares and required 400 milliliters of CNT dispersion. The final resistivity ranged between 15-19 ohms per square.

The urethane topcoat consists of a 100% solids biobased polyol, an isocyanate hardener and dibutyl tin dilaurate catalyst. While solvents will disrupt and destroy the conductivity of the carbon nanotube coating, a 100% solids urethane coating will not cause any changes in conductivity of the CNT coating. For this effort, the polyol used was developed in-house for low viscosity. It can be formulated with Tolonate HDT-LV2, a 100% solids Hexamethylene Diisocyanate hardener, but the cure time to final hardness is slow. These coatings were permitted to cure at room temperature, although a heat cycle will accelerate the cure.

During wind tunnel testing, first ice was accreted on the wing without activating the RHC system. Then the system was activated in de-icing and/or anti-icing operation modes. A majority of testing focused on determining anti-icing capabilities. As the testing progressed tunnel temperatures and Liquid Water Content (LWC) were adjusted to simulate continuous icing regimes at various RHC system power levels. Voltage was then increased to increase power densities to characterize operation of the technology.

A test matrix was developed in conjunction with AAI input to match FAA guidelines (FAA Part 25, Appendix C see US Federal Aviation Regulations, 14 C.F.R.). System level baseline concepts were implemented into the test sample. Testing was performed in a closed loop icing wind tunnel (Goodrich Icing Systems). Both anti-icing and de-icing tests were performed at voltages up 60 VDC & 7 Watts/in$^2$.

The wing was mounted vertically in the tunnel test section. The RHC coverage area on the wing was 5 inches× 40 inches (13 cm×101 cm). The test section offers optical access from cold room at left (top of wing), from control room at right (bottom of wing) and from top. 30 thermocouples were routed along bottom of test section. The wing Angle of Attack (AOA) was adjustable via indexed holes in the wing mounting plates.

The test matrix below illustrated the test conditions.

TABLE 1

Wind Tunnel Testing Conditions

| Angle of Attack (deg) | Velocity (MPH) | Tunnel Temp (F.) | Liquid Water Content (g/m^3)[1] | Water Spray Duration (mins) | Anti-Icing/ De-Icing[2] |
|---|---|---|---|---|---|
| 0 | 105 | 27 | 0.3 | 30 | Anti-Ice |
| 0 | 105 | 27 | 1.0 | 10 | Anti-Ice |
| 4 | 75 | 27 | 0.3 | 30 | Anti-Ice |
| 4 | 75 | 27 | 0.5 | 10 | Anti-Ice |
| 4 | 75 | 27 | 0.7 | 10 | Anti-Ice |
| 4 | 75 | 27 | 1.0 | 10 | Anti-Ice |
| 4 | 75 | 19 | 0.5 | 15 | Anti-Ice |
| 4 | 75 | 9 | 0.4 | 15 | Anti-Ice |
| 4 | 75 | 9 | 0.4 | 15 | Anti-Ice |
| 4 | 75 | 0 | 0.3 | 15 | Anti-Ice |
| 4 | 75 | 0 | 0.3 | 7.5 | Anti-Ice |
| 4 | 75 | 0 | 0.3 | 3 | Anti-Ice |
| 8 | 62 | 27 | 0.3 | 30 | Anti-Ice |
| 8 | 62 | 27 | 0.5 | 18 | Anti-Ice |
| 8 | 62 | 27 | 1.0 | 18 | Anti-Ice |
| 4 | 75 | 27 | 0.3 | 0 | De-Ice |
| 4 | 75 | 27 | 0.5 | 10 | De-Ice |
| 8 | 62 | 27 | 0.4 | 3 | De-Ice |
| 8 | 62 | 27 | 0.3 | 30 | De-Ice |

Notes:
[1] 20 micron water droplet size for all conditions listed
[2] Anti-Icing = RHC system switched on prior to water spray, preventing buildup of ice layer. De-Icing = RHC activated after ice buildup As described in Comparative Example 3 above, when water or water-based coatings are applied onto a resistive heating carbon nanotube coating prepared from an aqueous dispersion as in this example—the conductivity of the CNT networks is negatively influenced and the resistivity increases dramatically. If the CNT network were compromised by water from rain or ice formation on the surface of the wing, the resistive heating coating (RHC) would become inoperable. The 100% solids polyurethane protective coating prevents water from infiltrating into the CNT network and the heating performance was maintained throughout the wind tunnel tests.

Figure 2:
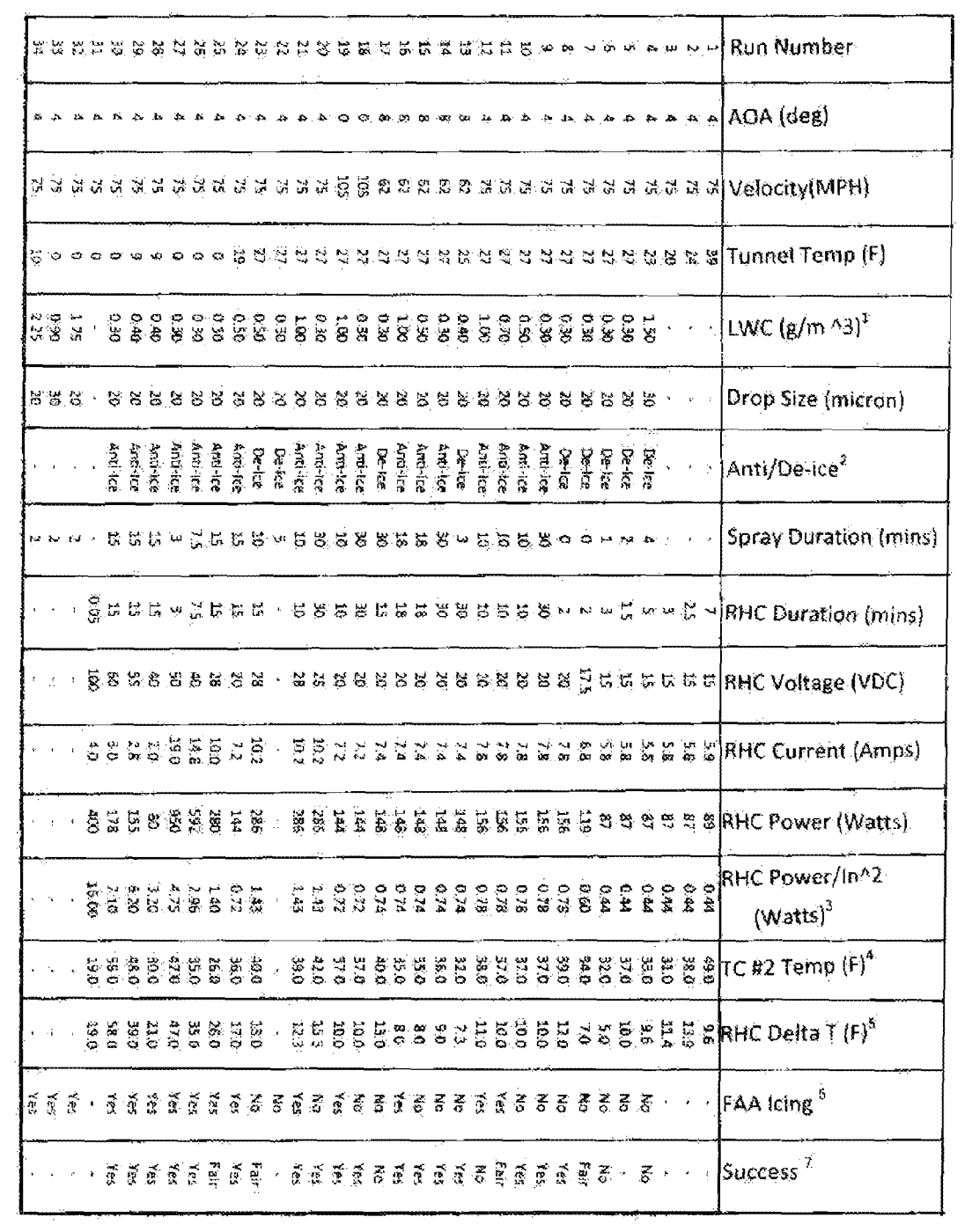

The full table of results of tests run in the icing wind tunnel are shown in FIG. 2. In FIG. 2, the footnotes have the following meanings:

Notes:
[1] Liquid Water Content sprayed during test run

[2] Anti-Icing=RHC system switched on prior to water spray, preventing buildup of ice layer. De-Icing=RHC activated after ice buildup

[3] System power density. 42" (106 cm) long wing sample has 200 in$^2$ (1000 cm$^2$) of RHC coated area, 15" (38 cm) long wing sample has 25 in$^2$ (160 cm$^2$) of RHC coated area

[4] Thermocouple #2 temperature, measured at the leading edge of the wing in the center of the RHC coating, represents system surface temp
[5] Temperature delta comparing Thermocouple #2 with wind tunnel temperature
[6] Test variables meet or exceed standard FAA icing condition charts
[7] Test was successful in preventing or removing ice buildup across ~90% or more of RHC coated area Examples of particularly successful runs can be seen in run numbers 9, 20, and 24-30.

The testing shows that RHC has anti-ice/de-ice capability as integrated onto a full size wing at representative flight conditions. It has successfully demonstrated anti-icing/de-icing capability at multiple test points between 0° F. and 28° F. (~18° C. and ~2° C.) using different LWC and droplet sizes. The operational envelop and power requirements were characterized. The higher the power density, the more severe the icing conditions can be tolerated. Additionally, increased power density offers better options for dealing with runback icing. The available power will influence final coating geometry and integration into an operational design. RHC is also an option for on-ground or on-launcher de-frost and anti-ice. The 100% solids polyurethane coating provided protection from the water droplets, ice formation and melting ice during all of the wind tunnel tests.

What is claimed:

1. A method of making a layered carbon nanotube (CNT) composite, comprising:
    providing a CNT layer that is disposed on a substrate, and
    applying a solventless polymer precursor directly onto the CNT layer to form a coating over the CNT layer having a thickness of at least 0.250 µm;
    wherein the solventless polymer precursor consists essentially of polyols and isocyanates and comprising a step of curing to form a polyurethane polymer;
    and wherein the step of applying results in a CNT layer that comprises 50 mass % or less of the polymer in the CNT layer;
    wherein the underlying CNT layer has a sheet resistance of 120 Ω/square or less.

2. The method of claim 1 wherein the resistivity of CNT layer increases by 81% or less after applying and curing the coating.

3. The method of claim 1 wherein the resistivity of CNT layer increases by 10% or less after applying and curing the coating.

4. The method of claim 1 wherein the solventless polymer precursor comprises a diisocyanate and a diol.

5. The method of claim 4 wherein the solventless polymer precursor is applied to the CNT layer by bar coating or spraying.

6. The method of claim 5 wherein the step of applying results in a CNT layer that comprises 10 mass % or less of a coating polymer within the CNT layer.

7. The method of claim 4 wherein the step of applying results in a CNT layer that comprises 10 mass % or less of a coating polymer within the CNT layer.

8. The method of claim 1 wherein the solventless polymer precursor consists essentially of a polyurethane precursor so that at least 99 mass % of the formulated coating composition remains in the dried film after cure has taken place.

9. The method of claim 1 wherein the step of applying results in the CNT layer comprising at least 50 mass % CNTs.

10. The method of claim 9 wherein the CNT layer comprises a dopant selected from the group consisting of: perfluorosulfonic acids, thionyl chloride, organic pi-acids, nitrobenzene, organometallic Lewis acids, organic Lewis acids, Bronsted acids, Nafion, hyaluronic acid, and combinations thereof.

11. The method of claim 1 wherein the solventless polymer precursor contacts the surface of the CNT network but does not fill spaces within the layer.

12. The method of claim 1 wherein the solventless polymer precursor comprises a polyisocyanate crosslinking agent.

13. The method of claim 12 wherein the polyisocyanate crosslinking agent comprises aliphatically, cycloaliphatically, araliphatically and/or aromatically bound isocyanate groups.

14. The method of claim 12 wherein the polyisocyanate crosslinking agent comprises at least one of: hexamethylene trimethylhexamethylene diisocycante, meta-α,α,α',α'-tetramethylxylylenediisocyanate, 1-isocyanato-3,3,5-trimethyl-5-isocyanatomethyl cyclohexane (isophoronoe diisocyanate or "IPDI"), bis(4-isocyanatocyclohexyl)methane (hydrogenate MDI), toluene diisocyanate ("TDI"), hexamethylene diisocyanate ("HDI") or biuret derivatives of various diisocyanates.

15. The method of claim 1 wherein the solventless polymer precursor is a liquid.

16. A method of making a layered carbon nanotube (CNT) composite:
    providing a CNT layer having a thickness of at least 0.250 µm that is disposed on a substrate; and
    applying a solventless polymer precursor directly onto the CNT layer to form a coating over the CNT layer having a thickness of at least 0.250 µm;
    wherein the step of applying results in a CNT layer that comprises 50 mass % or less of a coating polymer in the CNT layer after the CNT layer has been coated; and
    wherein the underlying CNT layer has a sheet resistance of 120 Ω/square or less.

17. The method of claim 16 wherein the step of applying results in a CNT layer that comprises 10 mass % or less of a coating polymer within the CNT layer.

18. The method of claim 16 wherein the step of applying results in the CNT layer comprising 30 to 100 mass % CNTs within the CNT layer.

19. A method of making a layered carbon nanotube (CNT) composite, comprising:
    providing a CNT layer that is disposed on a substrate, and
    applying a solventless polymer precursor directly onto the CNT layer to form a coating over the CNT layer having a thickness of at least 0.250 µm;
    wherein the solventless polymer precursor consists essentially of polyols and isocyanates and comprising a step of curing to form a polyurethane polymer;
    wherein the polyols comprise a polyester polyol and the isocyanates comprise hexamethylene diisocyanate;
    wherein the step of applying results in a CNT layer that comprises 50 mass % or less of the polymer within the CNT layer; and
    wherein the underlying CNT layer has a sheet resistance of 120 Ω/square or less.

* * * * *